(12) United States Patent
Lasher, III

(10) Patent No.: US 8,807,584 B2
(45) Date of Patent: Aug. 19, 2014

(54) STABILIZING DEVICE AND METHOD FOR HANDCYCLE

(71) Applicant: Lasher Sport, LLC, Anchorage, AK (US)

(72) Inventor: William J. Lasher, III, Anchorage, AK (US)

(73) Assignee: Lasher Sport, LLC., Anchorage, AK (US)

( * ) Notice: Subject to any disclaimer, the term of this patent is extended or adjusted under 35 U.S.C. 154(b) by 0 days.

(21) Appl. No.: 13/720,480

(22) Filed: Dec. 19, 2012

(65) Prior Publication Data
US 2014/0167383 A1    Jun. 19, 2014

(51) Int. Cl.
*B62M 1/14*    (2006.01)
*B62K 19/00*    (2006.01)
*B23P 11/00*    (2006.01)

(52) U.S. Cl.
CPC *B62K 19/00* (2013.01); *B23P 11/00* (2013.01)
USPC ..... 280/242.1; 280/249; 280/250; 280/288.1; 280/282; 280/281.1

(58) Field of Classification Search
USPC ......... 280/242.1, 249, 250, 288.1, 282, 281.1
See application file for complete search history.

(56) References Cited

U.S. PATENT DOCUMENTS

| 5,853,184 | A * | 12/1998 | Lofgren et al. | 280/242.1 |
| 6,302,421 | B1 * | 10/2001 | Lee | 280/210 |
| 6,402,166 | B1 * | 6/2002 | Chiu | 280/47.38 |
| 6,659,488 | B1 * | 12/2003 | Beresnitzky et al. | 280/282 |
| 7,083,175 | B1 * | 8/2006 | Liu | 280/47.38 |
| 7,213,818 | B2 * | 5/2007 | Chang | 280/47.38 |
| 7,258,353 | B2 * | 8/2007 | Liao | 280/47.38 |
| 7,530,932 | B2 * | 5/2009 | Lofgren et al. | 482/62 |
| 7,722,071 | B1 * | 5/2010 | Lofgren et al. | 280/282 |
| 7,744,102 | B2 * | 6/2010 | Bailey et al. | 280/47.38 |

* cited by examiner

*Primary Examiner* — Joseph M Rocca
*Assistant Examiner* — Marlon Arce
(74) *Attorney, Agent, or Firm* — Robert D. Atkins; Patent Law Group: Atkins and Associates, P.C.

(57) ABSTRACT

A stabilizing device for a handcycle has an axle including an inner shaft and an outer shaft. A first stabilizing component is coupled to the inner shaft. A second stabilizing component is coupled to the outer shaft in proximity to the first stabilizing component. A locking component is configured to engage the first and second stabilizing components to reversibly reduce rotation of the inner shaft with respect to the outer shaft. Alternatively, a stabilizing device for a handcycle has a frame including first and second stabilizing members affixed to the frame. A locking member is configured to engage the first and second stabilizing members to stabilize the frame. The stabilizing components or members include receptacles, teeth, or a friction component. The locking component or member includes a pin or knob configured to adjust the first or second stabilizing member into a locked position.

8 Claims, 11 Drawing Sheets

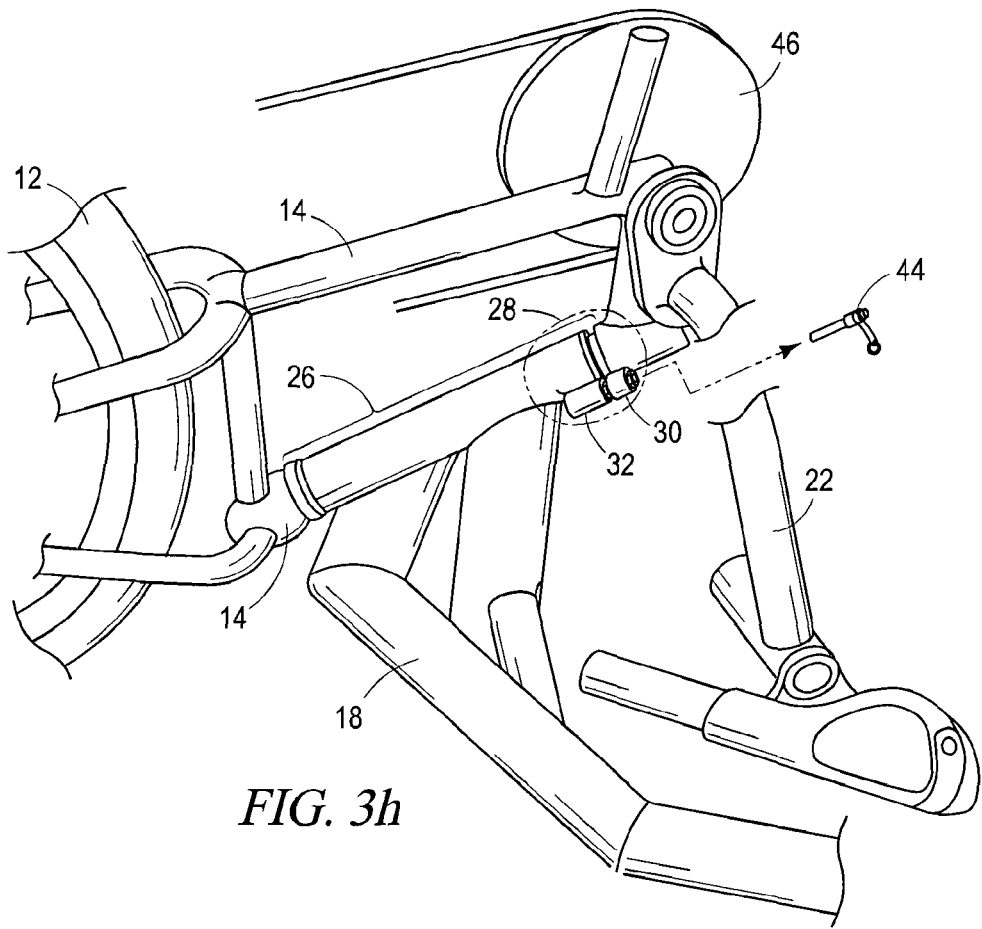
FIG. 3h
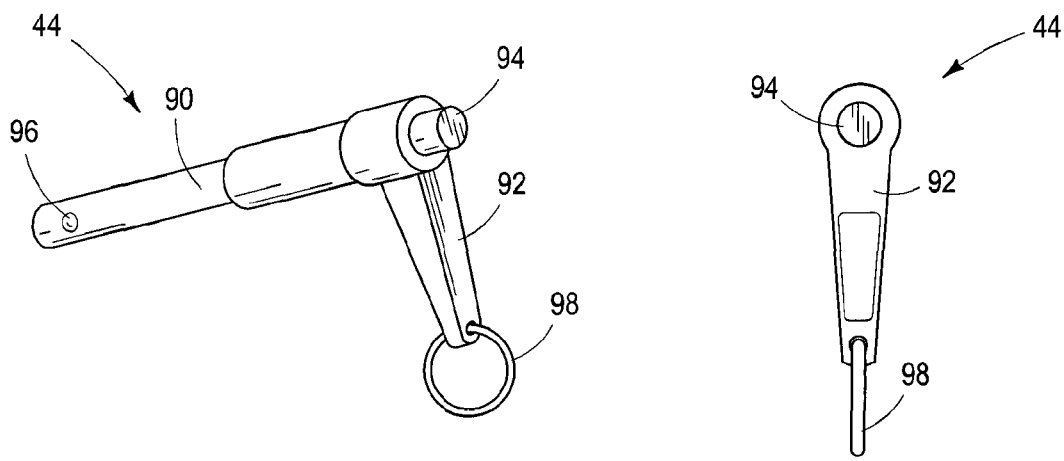
FIG. 4a
FIG. 4b

STABILIZING DEVICE AND METHOD FOR HANDCYCLE

FIELD OF THE INVENTION

The present invention relates in general to handcycles and, more specifically, to a system for stabilizing a handcycle during mounting and dismounting from the handcycle.

BACKGROUND OF THE INVENTION

Human-powered vehicles are used as a popular method of transport and exercise. Bicycles and handcycles are examples of human-powered vehicles used by people of many different abilities. A bicycle has two wheels and is powered by a person's legs, whereas a handcycle typically has three wheels and is powered by a person's arms. A handcycle, also called a handbike or hand trike, is propelled and steered through manipulation of the handlebars. The handlebars of a handcycle are coupled to one or more gears which turn a drive wheel or wheels on the handcycle. A rider rotates the handlebars in a crank-like motion to power the handcycle. A rider may operate a handcycle while sitting or reclining in a seat of the handcycle. A rider's legs may rest in stirrups or be secured to the frame of the handcycle. Because handcycles do not require use of the rider's legs, many riders with disabilities can use handcycles.

Handcycles are often designed with one front wheel and two back wheels but may also be designed in other configurations, such as with one back wheel and two front wheels. One common steering mechanism for the handcycle with a single front wheel is called fork-steering. Fork-steering requires the front wheel to turn or tilt with respect to the back wheels. In a fork-steering design, the handcycle frame has two portions. A front frame portion, called the fork, provides a mounting point for the handlebars and front wheel. A main frame of the handcycle provides a mounting point for the seat and back wheels. The fork moves freely with respect to the main frame so that the front wheel can be aimed in a direction different from the back wheels. Aiming the front wheel allows the rider to steer the handcycle. A rider manipulates the handlebars to turn or tilt the fork in order to steer the front wheel of the handcycle.

Many people who require a wheelchair for daily transportation can operate a handcycle. A person who uses a wheelchair must maneuver off of the wheelchair or other seat or device and onto the handcycle. When transferring from a wheelchair onto a handcycle, a rider grasps various parts of the handcycle for balance or stabilization. For example, a rider holds onto a handlebar or frame portion of the handcycle as the rider pulls the rider's body onto the handcycle. As another example, a rider leans onto a seat or frame portion of the handcycle for balance as the rider shifts body weight onto the handcycle.

During transition onto or off of the handcycle, the steering mechanism which allows the front fork of the handcycle frame to move freely with respect to the rest of the handcycle frame also makes the handcycle unsteady. For example, when the rider holds onto a handlebar while the rider shifts weight onto the handcycle, the rider pulls or pushes on the handlebar and the handlebar movement causes a wheel to turn or tilt. The unsteadiness of a handcycle due to the handcycle's moving parts can make maneuvering onto or off of the handcycle difficult, unsafe, or dangerous for a rider depending on the rider's physical capabilities. An unexpected turn or tilt of a wheel or frame during transfer onto or off of the handcycle can cause the rider to lose balance. A rider's loss of balance due to the handcycle's unsteadiness can cause injury if a rider falls or if rider's limbs are caught or tangled in the handcycle components.

To reduce the risk of injury and to make transfer onto and off of the handcycle easier, some riders use the assistance of another person. An assistant holds the handcycle to reduce movement of the handcycle and to help prevent one portion of the frame from turning, tilting, or rotating with respect to the other portion. The assistant thereby keeps the handcycle steady while the rider positions onto the handcycle. A handcycle rider who requires assistance with steadying the handcycle has limited independence in the use of a handcycle, because the rider cannot safely or easily get onto or off of the handcycle if the rider is alone.

SUMMARY OF THE INVENTION

A need exists for a handcycle to be temporarily stabilized during a rider's transition on and off of the handcycle to allow the rider to maneuver on and off of the handcycle safely and without assistance. More specifically, a need exists to temporarily restrict motion of a first portion of a handcycle frame with respect to a second portion of a handcycle frame. Accordingly, in one embodiment, the present invention is a stabilizing device for a handcycle comprising an axle including an inner shaft and an outer shaft. A first stabilizing component is coupled to the inner shaft. A second stabilizing component is coupled to the outer shaft in proximity to the first stabilizing component. A locking component is configured to engage the first and second stabilizing components to reduce rotation of the inner shaft with respect to the outer shaft.

In another embodiment, the present invention is a stabilizing device for a handcycle comprising a frame and a first stabilizing member affixed to the frame. A second stabilizing member is affixed to the frame. A locking member is configured to engage the first and second stabilizing members to stabilize the frame.

In another embodiment, the present invention is a handcycle comprising a frame including a first frame member rotationally coupled to a second frame member. A stabilizing assembly is disposed on the frame to reversibly limit motion of the first frame member with respect to the second frame member.

In another embodiment, the present invention is a method of making a stabilizing device for a handcycle comprising the steps of providing a frame including a first frame member rotationally coupled to a second frame member, disposing a first stabilizing member on the frame, disposing a second stabilizing member on the frame, and providing a locking member configured to engage the first and second stabilizing members to reversibly limit rotation of the first frame member with respect to the second frame member.

BRIEF DESCRIPTION OF THE DRAWINGS

FIG. 3h illustrates the axle of the handcycle with the stabilizing assembly disengaging into an unlocked position;

FIGS. 4a-4b illustrate the pin portion of the stabilizing assembly;

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
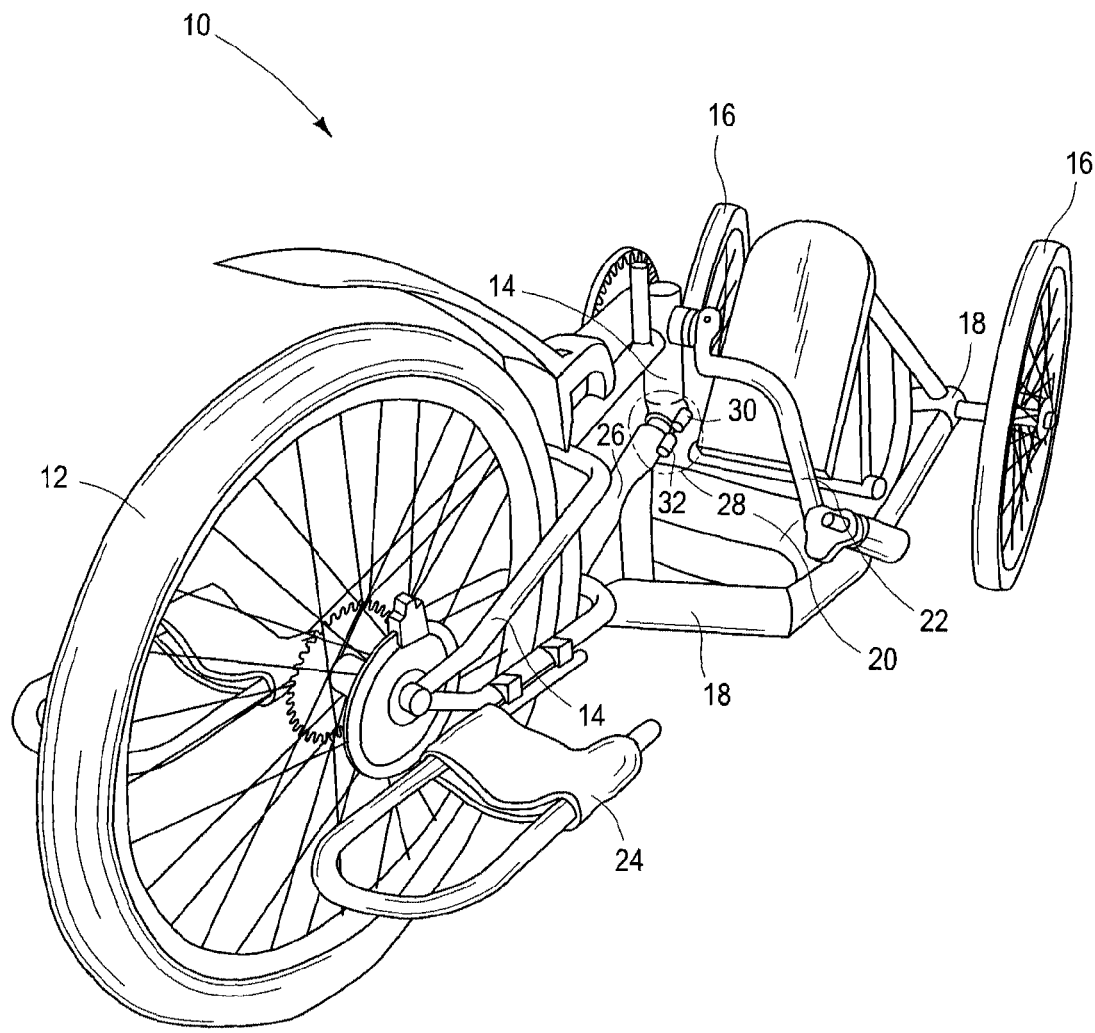
FIG. 1 illustrates the handcycle with the stabilizing assembly mounted to the frame.

A handcycle 10 is shown in FIG. 1. Handcycle 10 includes one front wheel 12 mounted to front fork 14. Two back wheels 16 are mounted to frame 18. Frame 18 also provides a mounting point for seat 20 of handcycle 10. Handlebars 22 and footrests 24 are mounted to front fork 14. In alternative embodiments, handcycle 10 can have other wheel configurations, including two front wheels and one back wheel or two front wheels and two back wheels.

Front fork 14 and frame 18 each constitutes a frame portion or frame member of handcycle 10. Front fork 14 extends from a steering area of handcycle 10 to front wheel 12. Front wheel 12 is also the drive wheel of handcycle 10, and handlebars 22 are used to propel front wheel 12. Handlebars 22 are also used to steer front fork 14 of handcycle 10. Front fork 14 is a part of frame 18 and is rotationally or pivotally coupled to frame 18 at axle 26. Front fork 14 rotates or pivots with respect to frame 18 at axle 26 when handlebars 22 are used to turn front fork 14.

Stabilizing assembly 28 is a temporary steering lock for handcycle 10. Stabilizing assembly 28 is disposed on frame 18 to reversibly limit rotation or motion of front fork 14 with respect to frame 18. Stabilizing assembly 28 includes two stabilizing components or stabilizing members rigidly attached to frame 18. First receptacle 30 and second receptacle 32 are eyelets or openings which each constitutes a stabilizing component or stabilizing member of stabilizing assembly 28. First receptacle 30 of stabilizing assembly 28 is welded to front fork 14 and rigidly affixed in a stationary position on front fork 14. Second receptacle 32 of stabilizing assembly 28 is welded to frame 18 at or near axle 26 and rigidly affixed in a stationary position on frame 18. First receptacle 30 aligns with second receptacle 32 when front wheel 12 is aligned in a substantially similar direction as back wheels 16. Stabilizing assembly 28 is positioned to lock when first receptacle 30 aligns with second receptacle 32.

Figure 2A:
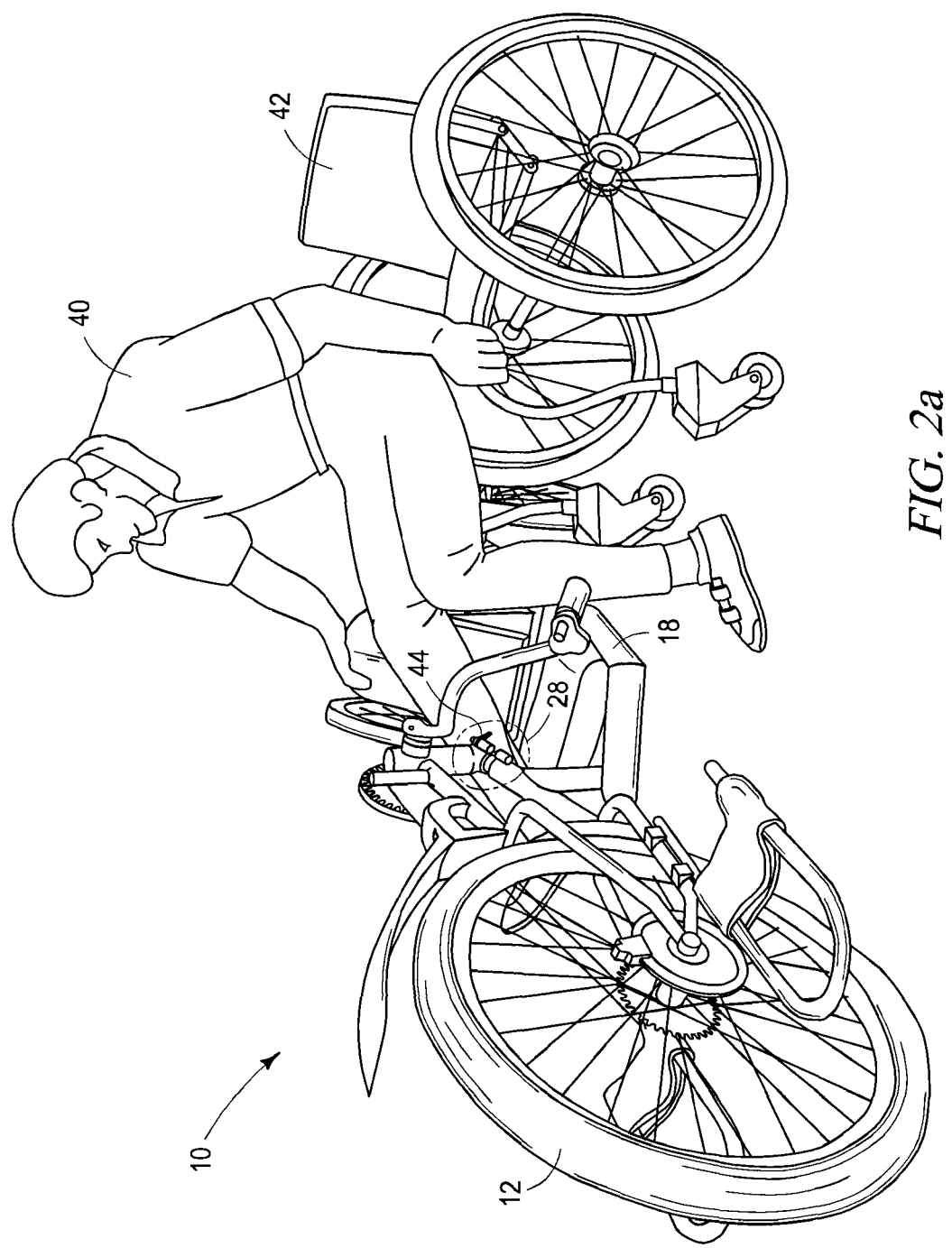
FIGS. 2a-2c illustrate the rider maneuvering out of the wheelchair and onto the handcycle.
Figure 2B:
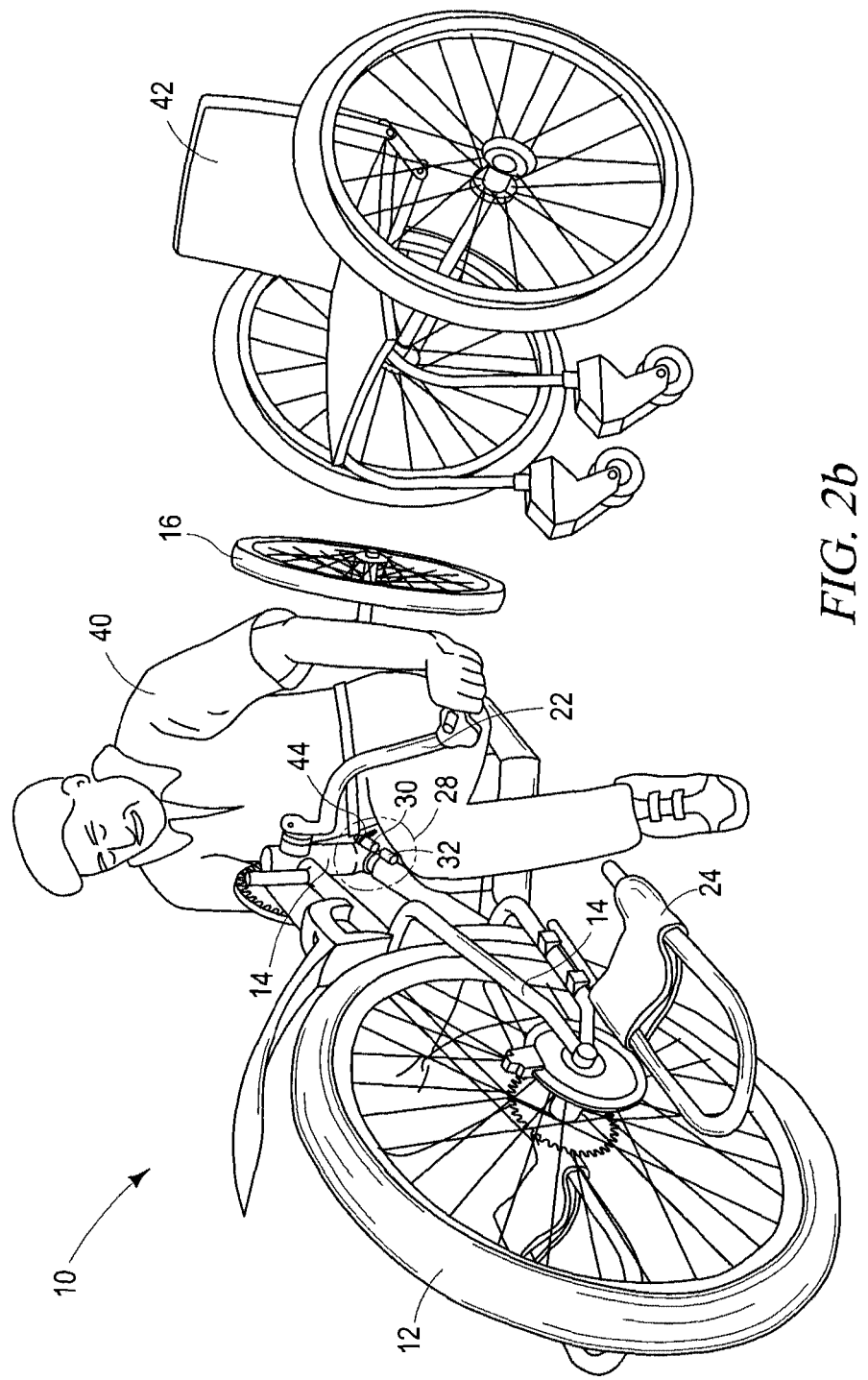
Figure 2C:
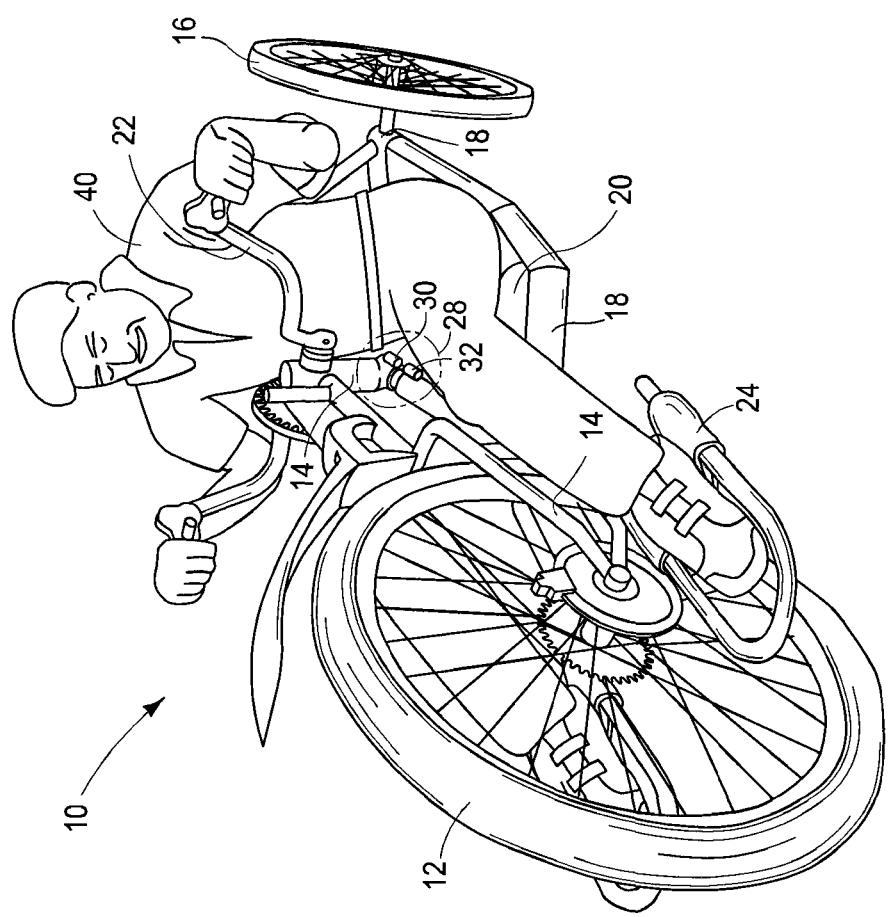

FIGS. 2a-2c illustrate stabilizing assembly 28 in use as rider 40 transitions out of wheelchair 42 and onto handcycle 10. Stabilizing assembly 28 temporarily locks the steering capability of handcycle 10 to stabilize handcycle 10 while rider 40 positions onto or off of handcycle 10. Rider 40 requires less assistance getting onto or off of handcycle 10 because frame 18, including front fork 14, of handcycle 10 is more stable when stabilizing assembly 28 is locked.

Rider 40 prepares to engage stabilizing assembly 28 into the locked position before transferring from wheelchair 42 onto handcycle 10. Rider 40 manipulates handlebars 22 of handcycle 10 to adjust front fork 14 and to point front wheel 12 forward in order to align first receptacle 30 with second receptacle 32. Rider 40 locks stabilizing assembly 28 by inserting pin 44 through first receptacle 30 and second receptacle 32. Pin 44 is a locking component or locking member configured to fit through first receptacle 30 and second receptacle 32 to substantially reduce or limit rotation of front fork 14 with respect to frame 18. Pin 44 secures first receptacle 30 and second receptacle 32 together to stabilize handcycle 10 and limit movement of first receptacle 30 and front fork 14 with respect to second receptacle 32 and frame 18. Pin 44 locks stabilizing assembly 28 which locks the steering mechanism of handcycle 10. Locked stabilizing assembly 28 allows front wheel 12 to remain aligned with back wheels 16 by limiting rotation of front fork 14 with respect to frame 18, thereby stabilizing handcycle 10.

FIG. 2a shows rider 40 beginning to transfer from wheelchair 42 onto handcycle 10. Rider 40 transfers onto handcycle 10 without assistance because handcycle 10 is stabilized. Rider 40 uses wheelchair 42 or handcycle 10 for balance and leverage as rider 40 transfers onto handcycle 10. Rider 40 has one hand on wheelchair 42 and one hand on handcycle 10 while rider 40 transfers body weight from wheelchair 42 onto handcycle 10. Stabilizing assembly 28 is engaged in a locked position, i.e., pin 44 is inserted into first receptacle 30 and second receptacle 32 of stabilizing assembly 28 to stabilize handcycle 10. Rider 40 can safely lean on handcycle 10 because stabilizing assembly 28 maintains front fork 14 in a stationary position with respect to frame 18. Handcycle 10 is steady as rider 40 holds onto handcycle 10 during transition on or off of handcycle 10.

FIG. 2b shows rider 40 transitioned out of wheelchair 42 and almost fully onto handcycle 10. Rider 40 is able to position onto handcycle 10 without the assistance of another person, because handcycle 10 is stabilized by locked stabilizing assembly 29. Pin 44 remains inserted through first receptacle 30 and second receptacle 32 while rider 40 positions onto handcycle 10. Rider 40 has one hand on seat 20 or frame 18 and the other hand on handlebars 22. Rider 40 shifts weight from one area of handcycle 10 to another area of handcycle 10 as rider 40 adjusts into a comfortable riding position. Front wheel 12 does not turn or tilt if rider 40 puts weight onto handlebars 22. Front fork 14 remains restricted in a fixed position relative to frame 18 as rider 40 uses components of handcycle 10 for balance and leverage to position onto handcycle 10. Stabilizing assembly 28 remains in the locked and stabilized position until stabilizing assembly 28 is manually disengaged.

FIG. 2c shows rider 40 in a riding position on handcycle 10. Rider 40 unlocks stabilizing assembly 28 to reengage the steering of handcycle 10 once rider 40 has positioned onto handcycle 10. Rider 40 is fully transferred onto handcycle 10 and rider 40 sits on seat 20. Rider 40 places hands on handlebars 22 and feet onto footrests 24. When rider 40 is ready to propel and ride handcycle 10, rider 40 disengages stabilizing assembly 28 by removing pin 44 from stabilizing assembly 28. Stabilizing assembly 28 is in the unlocked position when pin 44 is removed from at least second receptacle 32, and preferably also from first receptacle 30. Rider 40 rides handcycle 10 while handcycle 10 is in the unlocked position, because handcycle 10 can be steered when in the unlocked position. Front fork 14 can freely rotate and tilt or turn with respect to frame 18 when stabilizing assembly 28 is unlocked. Rider 40 grasps or otherwise secures to handlebars 22 which are coupled to front fork 14. Rider 40 rotates or cranks handlebars 22 to turn one or more gears which drive front wheel 12 and propels handcycle 10. Rider 40 manipulates handlebars 22 to tilt and turn front fork 14 and front wheel 12 in order to steer handcycle 10.

Figure 3A:
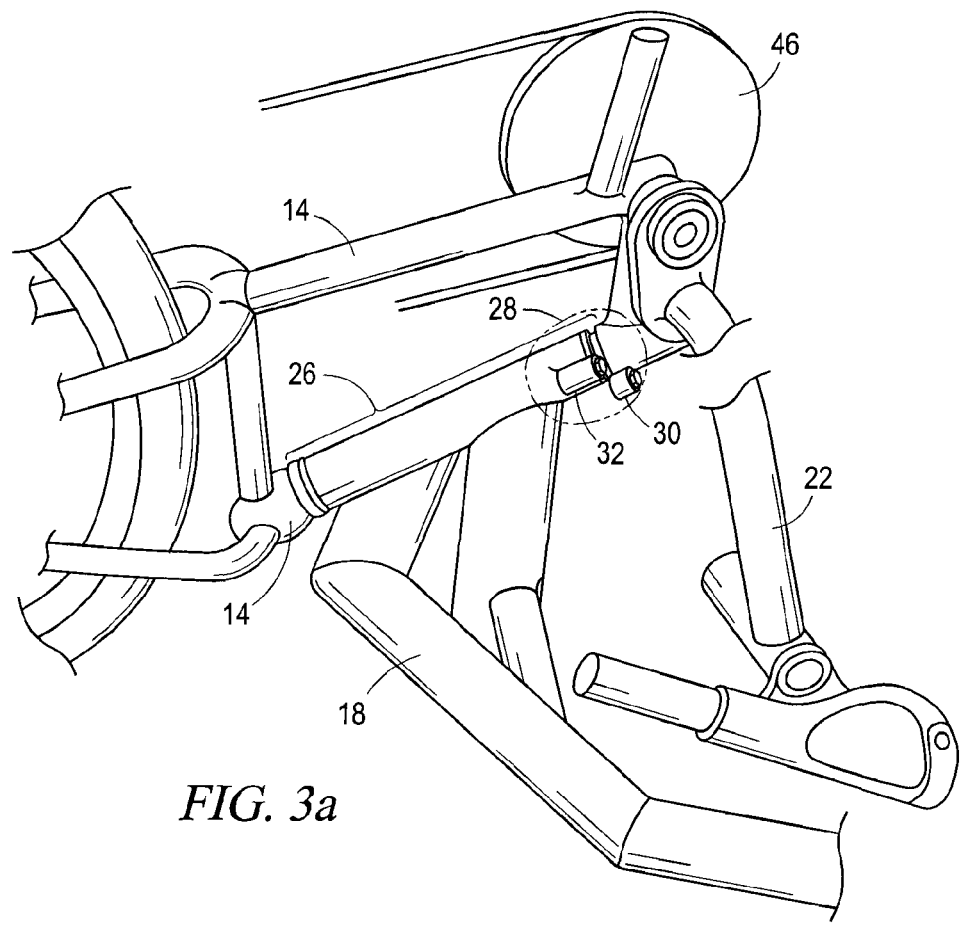
FIG. 3a illustrates the axle of the handcycle in position for riding and with the stabilizing assembly unlocked.

FIGS. 3a-3h illustrate further detail of axle 26 and stabilizing assembly 28 of handcycle 10. FIG. 3a shows axle 26 where front fork 14 and frame 18 interface and stabilizing assembly 28 is in the unlocked position. Front fork 14 provides a mounting point for handlebars 22, first receptacle 30, gear 46, front wheel 12, and other components of handcycle 10 including breaks, break lines, additional gears, chains, and accessories. First receptacle 30 is welded to front fork 14 to rigidly attach first receptacle 30 in a stationary position on front fork 14. Frame 18 supports the remaining components of handcycle 10 including seat 20, a rear axle, and back wheels 16. Frame 18 provides a mounting point for second receptacle 32 of stabilizing assembly 28. Second receptacle 32 is welded to frame 18 to rigidly attach second receptacle 32 in a stationary position on frame 18. Front fork 14 and the components mounted to front fork 14 are able to rotate with respect to frame 18 at axle 26 when stabilizing assembly 28 is in the unlocked position.

Figure 3B:
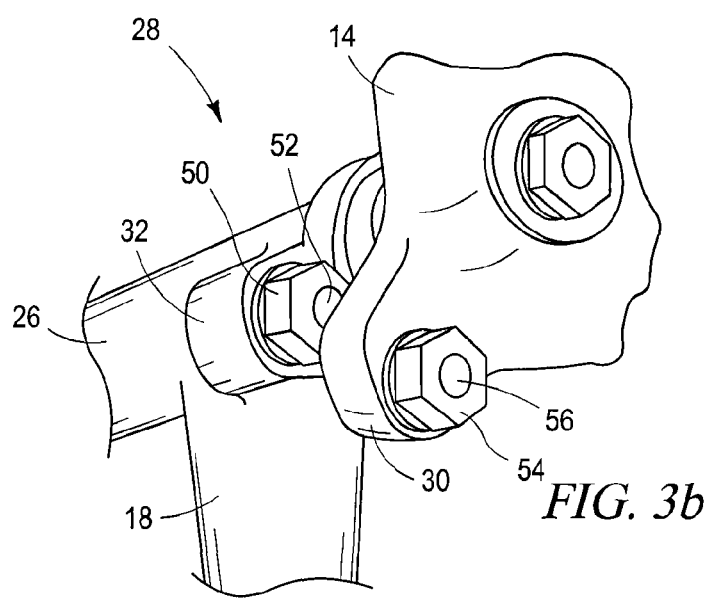
FIG. 3b illustrates further detail of the stabilizing assembly unlocked and the handcycle in position for riding.

FIG. 3b shows further detail of stabilizing assembly 28 of handcycle 10 in the unlocked position. First receptacle 30 is rigidly attached to front fork 14 at or near axle 26 of handcycle 10. First receptacle 30 is welded onto front fork 14 or is separately affixed to, disposed on, or integrated with front fork 14 such that first receptacle 30 is stationary with respect to front fork 14. First receptacle 30 is a cylindrical or tubular column and comprises an eyelet or opening adapted to receive pin 44. First receptacle 30 further includes first bushing 54, which is a bearing adapted to receive pin 44. First receptacle 30 and first bushing 54 include first hole 56. First hole 56 is an eyelet, cavity, or opening extending through first bushing 54 and first receptacle 30. First receptacle 30 and first bushing 54 can be metal, metal alloy, polymer, fiberglass, carbon fiber, composite, or a natural material. For example, first receptacle 30 and first bushing 54 are metal and welded to front fork 14 or are attached in another rigid manner, such as with adhesive or with a clip.

Second receptacle 32 is rigidly attached to frame 18 at or near axle 26 of handcycle 10. Second receptacle 32 is welded onto frame 18 or is separately affixed to, disposed on, or integrated with frame 18 such that second receptacle 32 is stationary with respect to frame 18. Second receptacle 32 is a cylindrical or tubular column and comprises an eyelet or opening adapted to receive pin 44. Second receptacle 32 further includes second bushing 50, which is a bearing adapted to receive pin 44. Second receptacle 32 and second bushing 50 include second hole 52. Second hole 52 is an eyelet, cavity, or opening extending through second bushing 50 and second receptacle 32. Second receptacle 32 and second bushing 50 can be metal, metal alloy, polymer, fiberglass, carbon fiber, composite, or a natural material. For example, second receptacle 32 and second bushing 50 are metal and welded to frame 18 or are attached in another rigid manner, such as with adhesive or with a clip.

Figure 3C:
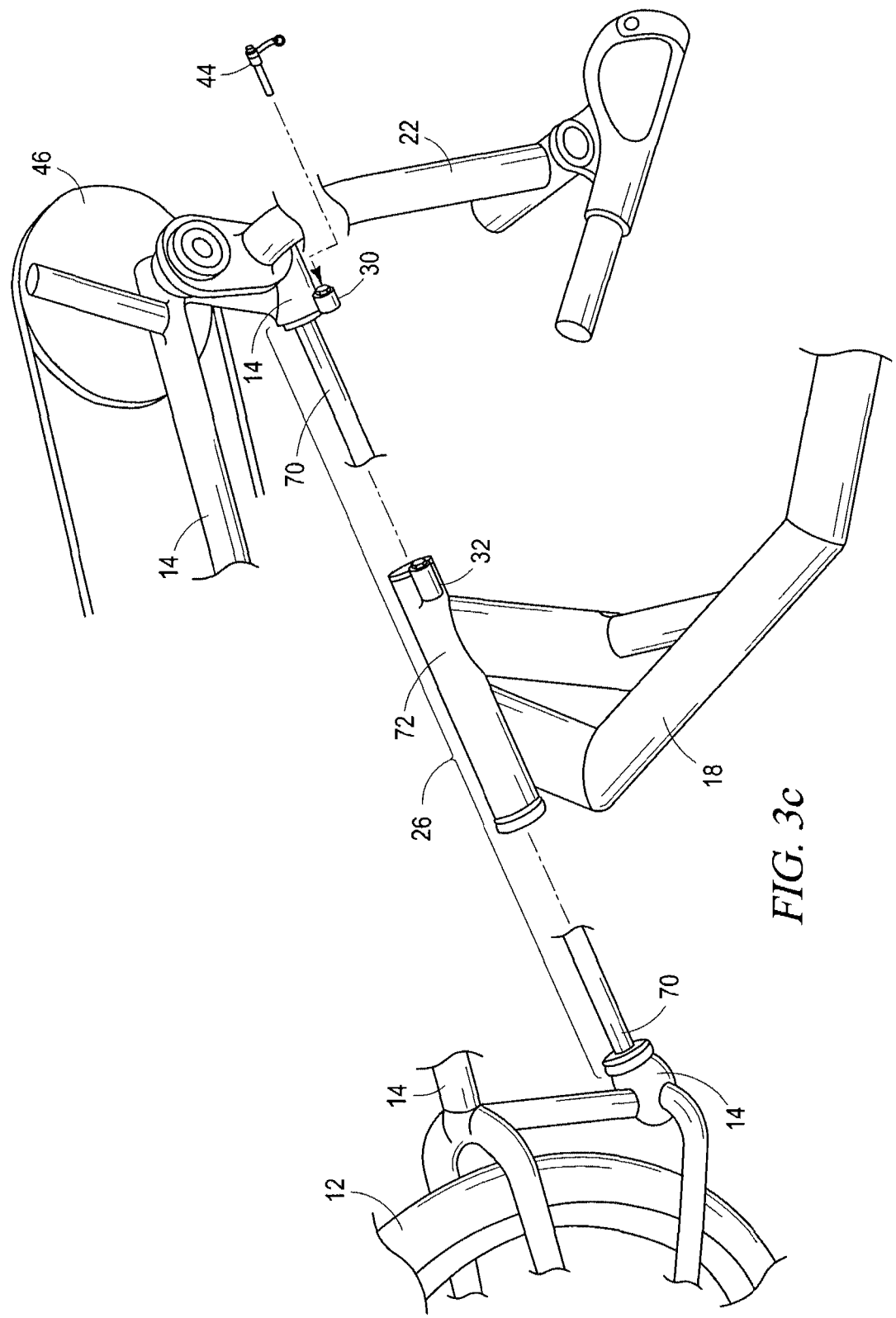
FIG. 3c illustrates an expanded view of the axle of the handcycle.

FIG. 3c illustrates an expanded view of axle 26 of handcycle 10. Axle 26 is a part of frame 18. Axle 26 includes inner shaft 70 and outer shaft 72. Inner shaft 70 is coupled to or integrated with front fork 14. Inner shaft 70 extends from the steering area, which includes handlebars 22 and gear 46, down to the forked area of front fork 14, where front fork 14 couples to front wheel 12. Outer shaft 72 is hollow and is coupled to or integrated with frame 18. Inner shaft 70 extends through outer shaft 72 of frame 18 at axle 26. Inner shaft 70 is rotationally or pivotally coupled to outer shaft 72. Inner shaft 70 rotates within outer shaft 72 of frame 18 to turn front wheel 12 and steer handcycle 10. Frame 18 including front fork 14, axle 26, inner shaft 70, and outer shaft 72 may comprise metal, metal alloy, polymer, fiberglass, carbon fiber, composite, or a natural material.

Stabilizing assembly 28 is coupled to front fork 14 and frame 18 at axle 26. First receptacle 30 is an eyelet rigidly attached or welded to inner shaft 70 to maintain first receptacle 30 in a stationary position on inner shaft 70. Second receptacle 32 is an eyelet rigidly attached or welded to outer shaft 72 of frame 18 in proximity to first receptacle 30. Second receptacle 32 is mounted in a stationary position to outer shaft 72. Pin 44 is configured to engage or to fit through first receptacle 30 and second receptacle 32 when first hole 56 is substantially aligned with second hole 52. Pin 44 fits through first receptacle 30 and second receptacle 32 to lock stabilizing assembly 28 and reversibly limit or reduce rotation of inner shaft 70 with respect to outer shaft 72.

Figure 3D:
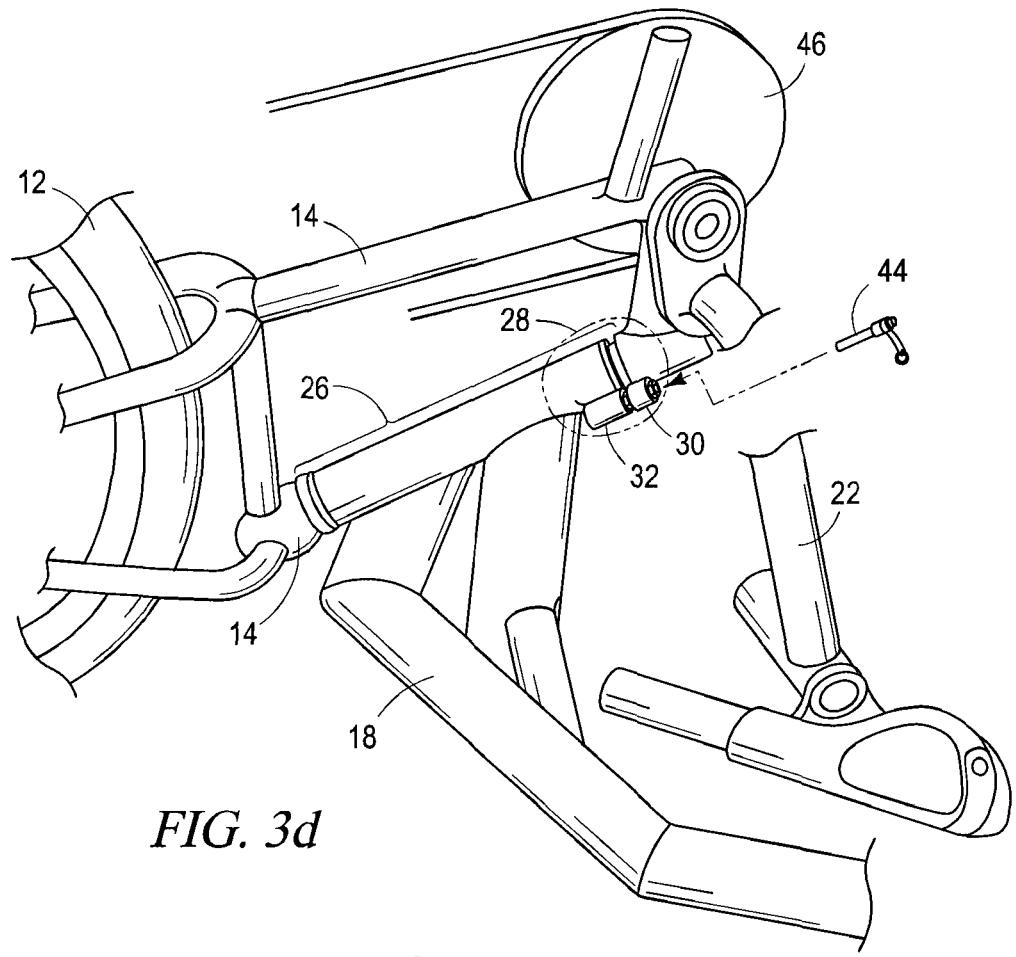
FIG. 3d illustrates the axle of the handcycle with the stabilizing assembly ready to lock.

FIG. 3d illustrates axle 26 of handcycle 10 with stabilizing assembly 28 in a position ready to be locked. Rider 40 prepares to lock stabilizing assembly 28 before getting onto or off of handcycle 10. Handlebars 22 are manipulated in order to align first receptacle 30 and second receptacle 32 of stabilizing assembly 28. Handlebars 22 are used to turn front fork 14 with respect to frame 18 until front fork 14 is in a position where front wheel 12 is aimed forward relative to handcycle 10 and first receptacle 30 is aligned with second receptacle 32. Pin 44 enters first receptacle 30 and second receptacle 32 to lock stabilizing assembly 28.

Figure 3E:
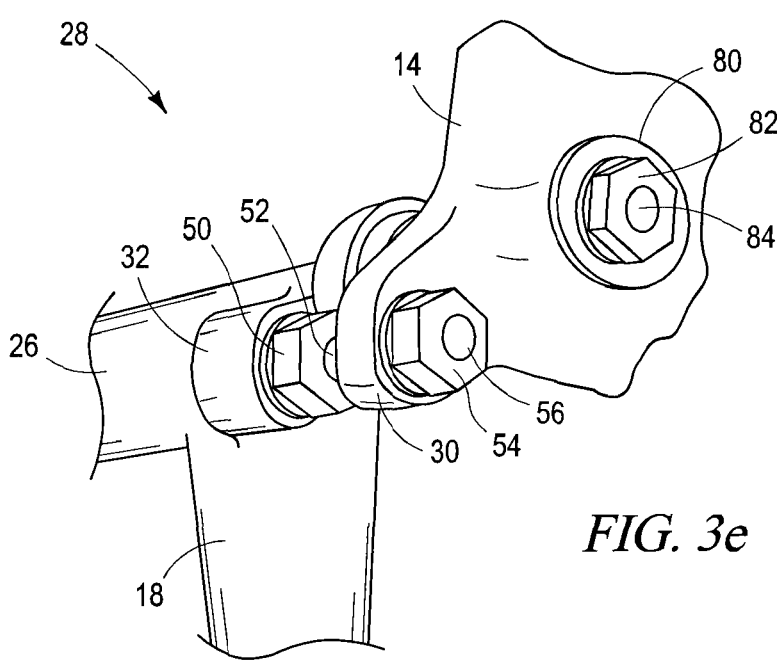
FIG. 3e illustrates further detail of the stabilizing assembly ready to lock.

FIG. 3e shows further detail of stabilizing assembly 28 of handcycle 10 ready to be locked. First hole 56 of first bushing 54 and first receptacle 30 is aligned with second hole 52 and second bushing 50 of second receptacle 32. Pin 44 may initially be stored in pin storage location 80 in front fork 14. Pin storage location 80 may comprise storage bushing 82. Pin storage location 80 comprises storage opening 84 in front fork 14. Storage opening 84 is a cylindrical hole extending through storage bushing 82 and into front fork 14. Pin storage location 80 is configured to receive and secure pin 44 while pin 44 is not being used to lock stabilizing assembly 28.

Pin 44 is removed from pin storage location 80 in preparation to use pin 44 to lock stabilizing assembly 28. Stabilizing assembly 28 is oriented such that first receptacle 30 is located in close proximity to second receptacle 32. First hole 56 and second hole 52 are aligned on a common axis to form a continuous opening adapted to receive pin 44. The axis of stabilizing assembly 28 is parallel to inner shaft 70 and outer shaft 72. First receptacle 30 and second receptacle 32 are configured to stabilize front fork 14 with respect to frame 18 upon insertion of a locking component such as pin 44.

Figure 3F:
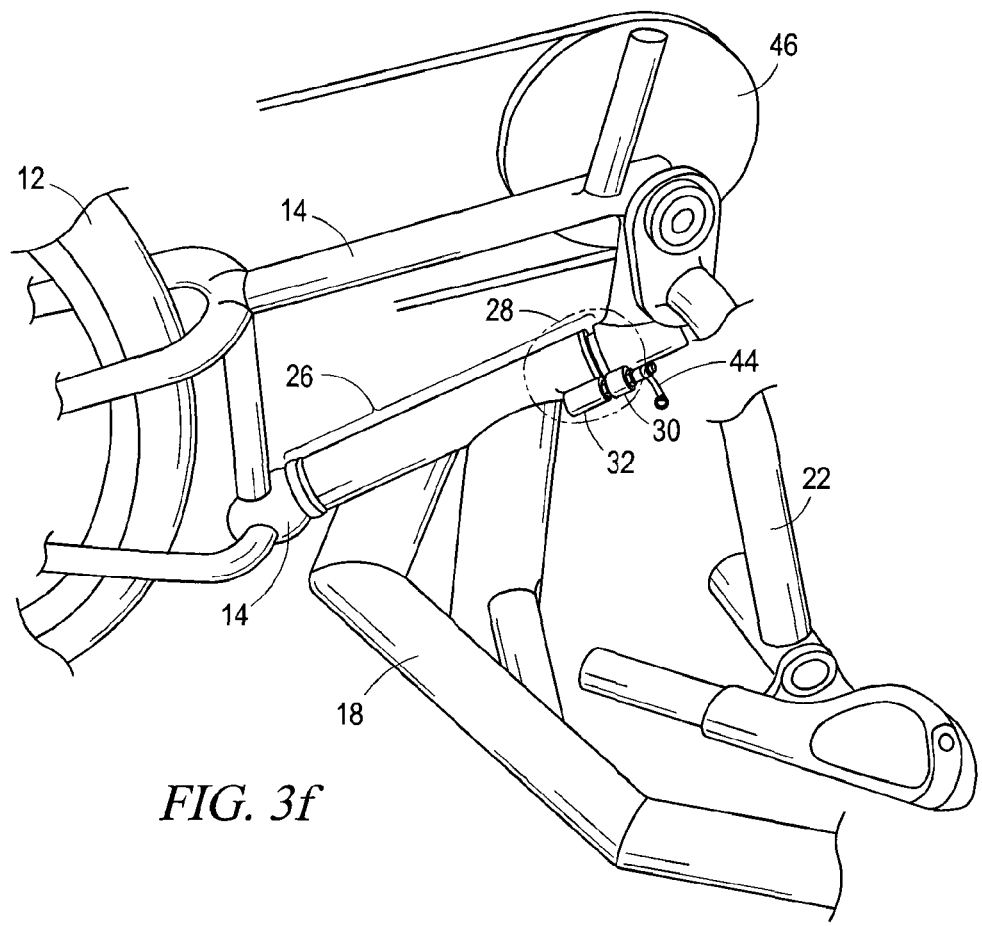
FIG. 3f illustrates the axle of the handcycle with the stabilizing assembly engaged in a locked position.

FIG. 3f illustrates axle 26 of handcycle 10 with stabilizing assembly 28 in the locked position. Stabilizing assembly 28 is configured to temporarily lock the steering capability of handcycle 10 while rider 40 enters or exits handcycle 10. Pin 44 is inserted through the aligned first receptacle 30 and second receptacle 32 and stabilizing assembly 28 is locked. Stabilizing assembly 28 restricts movement of front fork 14 when pin 44 is inserted through stabilizing assembly 28. Pin 44 extends through the aligned first receptacle 30 and second receptacle 32. Rider 40 can use handlebars 22 for leverage and balance to position the rider's body onto or off of handcycle 10 without front fork 14 and front wheel 12 tilting or turning. Stabilizing assembly 28 substantially reduces the instability of handcycle 10 by restricting the steering capability of handcycle 10.

Figure 3G:
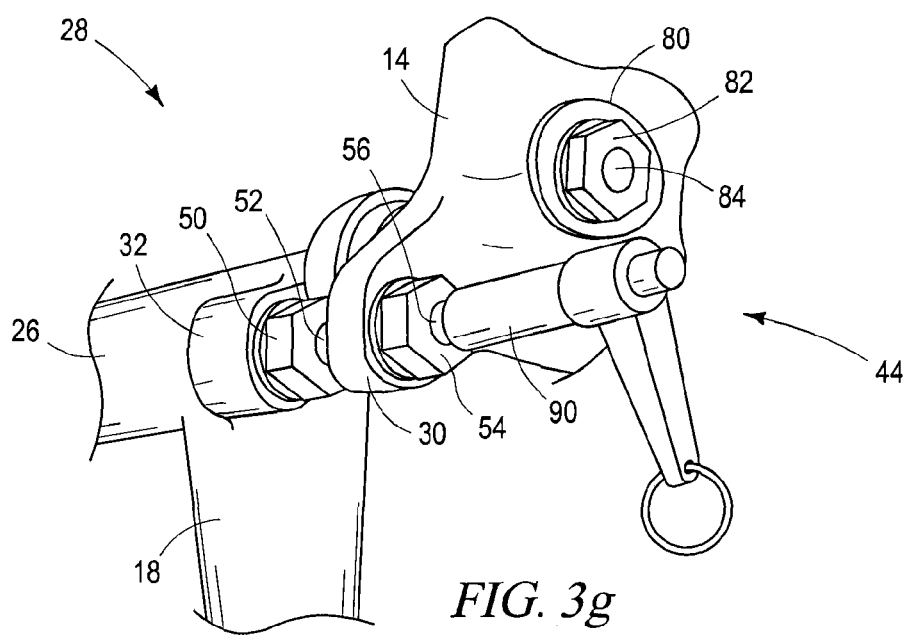
FIG. 3g illustrates further detail of the stabilizing assembly engaged in a locked position.

FIG. 3g shows further detail of stabilizing assembly 28 of handcycle 10 in the locked position. Pin 44 is removed from pin storage location 80 and pin 44 is inserted through first receptacle 30 and second receptacle 32. Pin 44 enters first hole 56 in first bushing 54 and first receptacle 30 and second hole 52 in second bushing 50 and second receptacle 32. Pin 44 joins first receptacle 30 with second receptacle 32 to stabilize handcycle 10. Pin 44 restricts or prevents first receptacle 30 from moving with respect to second receptacle 32 along a direction perpendicular to pin shaft 90 of pin 44. Therefore, locked stabilizing assembly 28 reduces or limits rotation and movement of inner shaft 70 and front fork 14 with respect to outer shaft 72 and frame 18. Pin 44 withstands force applied perpendicularly by first receptacle 30 to pin shaft 90 of pin 44 when rider 40 grasps or leans on handlebars 22 or front fork 14.

FIG. 3h illustrates axle 26 of handcycle 10 with stabilizing assembly 28 being disengaged into an unlocked position. Stabilizing assembly 28 is a temporary stabilizing mechanism which can be manually locked and unlocked. The restriction of motion, rotation, or pivot of front fork 14 when stabilizing assembly 28 is locked is reversed by unlocking stabilizing assembly 28. Rider 40 removes pin 44 from second receptacle 32 and first receptacle 30. Removing pin 44 from stabilizing assembly 28 allows the steering capability to be reengaged for handcycle 10. Front fork 14 is free to rotate with respect to frame 18 when pin 44 is removed from stabilizing assembly 28 and stabilizing assembly 28 is in the unlocked position.

FIGS. 4a-4b illustrate further detail of pin 44. FIG. 4a shows a perspective view of pin 44. Locking component of stabilizing assembly 28 includes a pin, knob, or other locking device. Pin 44 includes a push button or quick release. Pin 44 comprises pin shaft 90, pin handle 92, quick release button 94, and ball lock 96. Ball lock 96 is retractable and quick release button 94 is pushed to insert or remove pin 44 from stabilizing assembly 28. Quick release button 94 operates to retract ball lock 96 when quick release button 94 is pushed. Ball lock 96 protrudes from pin shaft 90 of pin 44 when quick release button 94 is released. Ball lock 96 locks or secures pin 44 into first receptacle 30 and second receptacle 32. Ball lock 96 and quick release button 94 restrain pin 44 within stabilizing assembly 28. Pin 44 may also comprise ring 98 which is used to conveniently grasp or hold pin 44 and can be also used to store pin 44, for example, by using ring 98 to secure pin 44 to a cord, clothing, a bag, or part of handcycle 10.

FIG. 4b shows a front view of pin 44. Pin handle 92 and quick release button 94 are configured to allow quick release button 94 to be pushed as pin handle 92 is grasped. Thus, pin 44 can be operated using one hand. Pin 44 allows stabilizing assembly 28 to be locked or unlocked quickly and easily. Pin 44 is metal, metal alloy, polymer, fiberglass, carbon fiber, composite, or a natural material. Pin shaft 90 may comprise a different material than pin handle 92.

Figure 5:
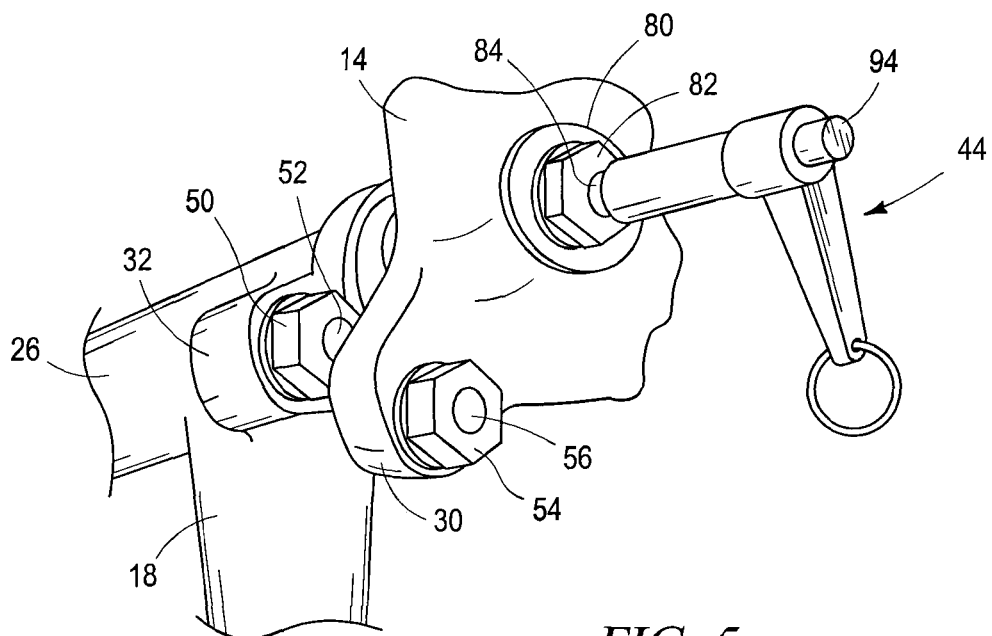
FIG. 5 illustrates the pin in the storage position.

FIG. 5 illustrates pin 44 in a storage position. Pin storage location 80 is disposed on front fork 14 and comprises storage bushing 82. Storage opening 84 extends through storage bushing 82 and into front fork 14. Pin 44 is removed from stabilizing assembly 28 when rider 40 is fully transferred onto handcycle 10 and is ready to ride handcycle 10. Quick release button 94 is pressed and pin 44 is fully removed from stabilizing assembly 28. Quick release button 94 may be pressed again before inserting pin 44 into storage opening 84 of pin storage location 80. Pin 44 is stored in pin storage location 80 when stabilizing assembly 28 is unlocked. Pin storage location 80 is separate from stabilizing assembly 28 for safety and to prevent stabilizing assembly 28 from automatically or accidentally engaging and locking. Pin storage location 80 is embedded within front fork 14 for easy access to pin 44.

Figure 6:
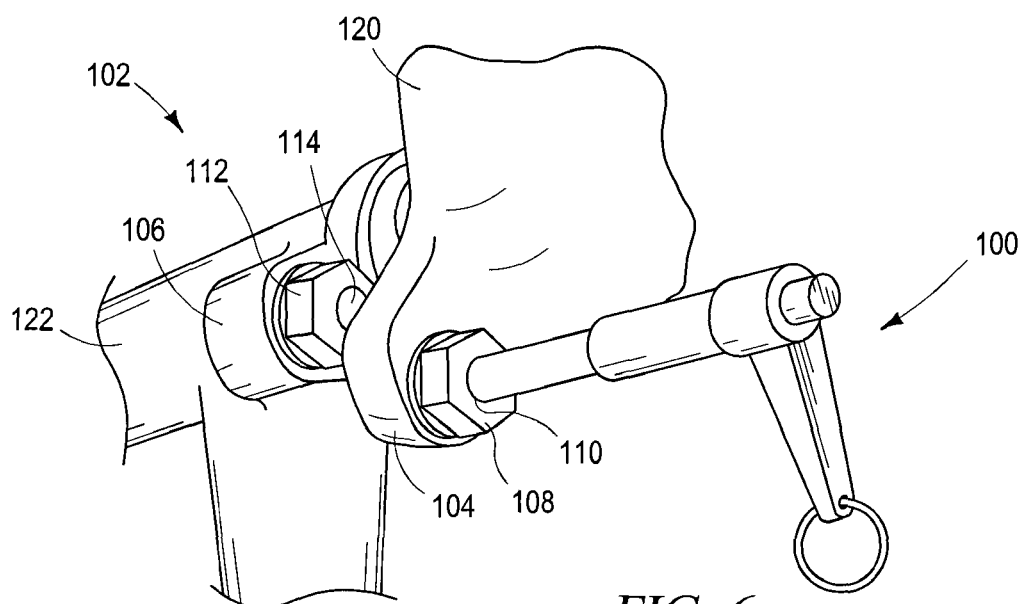
FIG. 6 illustrates an alternative embodiment of the stabilizing assembly with a retractable pin.

FIG. 6 shows an alternative embodiment of the locking component where pin 100 is retractable and is shown in a retracted position. Like stabilizing assembly 28, stabilizing assembly 102 is a temporary stabilizing device which holds handcycle 10 steady for a rider to maneuver onto or off of handcycle 10. Stabilizing assembly 102 comprises first receptacle 104 and second receptacle 106, which are stabilizing components or members. First receptacle 104 includes first bushing 108 and first hole 110. First hole 110 extends through first receptacle 104 and first bushing 108. Second receptacle 106 includes second bushing 112 and second hole 114. Second hole 114 extends through second receptacle 106 and second bushing 112. Pin 100 retracts partially or fully out of stabilizing assembly 102. Pin 100 retracts completely out of second receptacle 106 and completely or partially out of first receptacle 104 to unlock stabilizing assembly 102.

First receptacle 104 is welded to front fork 120 and rigidly affixed in a stationary position on front fork 120. Second receptacle 106 is welded to frame 122 and rigidly affixed in a stationary position on frame 122. Pin 100 is configured to engage and lock first receptacle 104 and second receptacle 106 to reversibly reduce or limit rotation of front fork 120 with respect to frame 122. Front fork 120 rotates or pivots freely with respect to frame 122 when pin 100 is retracted out of at least second receptacle 106. Front fork 120 and first receptacle 104 are configured to hold pin 100 once it has retracted. A portion of pin 100 may remain within first hole 110 in first bushing 108 and first receptacle 104 to store pin 100 in a retracted position.

Figure 7:
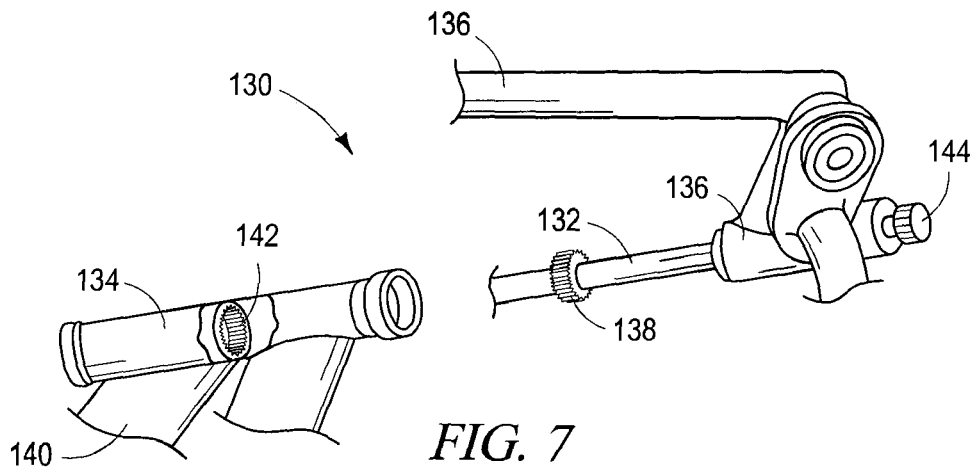
FIG. 7 illustrates an alternative embodiment of the stabilizing assembly with locking teeth.

FIG. 7 shows an alternative embodiment of the stabilizing assembly with locking teeth. Like stabilizing assembly 28, stabilizing assembly 130 is a temporary stabilizing device which holds handcycle 10 steady for a rider to safely maneuver onto or off of handcycle 10. Stabilizing assembly 130 comprises inner shaft 132 and outer shaft 134. Inner shaft 132 is coupled to front fork 136. Inner shaft 132 includes a first stabilizing component or member which comprises a plurality of inner shaft teeth 138 disposed on the outside or peripheral surface of inner shaft 132. Outer shaft 134 is coupled to frame 140. Outer shaft 134 includes a second stabilizing component or member which comprises a plurality of outer shaft teeth 142. Outer shaft teeth 142 are disposed on an inner surface of outer shaft 134. Inner shaft teeth 138 fit into outer shaft teeth 142 in a locked position. Inner shaft teeth 138 and outer shaft teeth 142 fit together to limit, reduce or prevent rotation of inner shaft 132 with respect to outer shaft 134.

Knob 144 is a locking component or locking member configured to engage inner shaft teeth 138 and outer shaft teeth 142 to reversibly reduce or limit rotation of inner shaft 132 with respect to outer shaft 134. Knob 144 operates to adjust and position inner shaft teeth 138 into outer shaft teeth 142 to engage stabilizing assembly 130 into a locked position. Knob 144 lowers inner shaft teeth 138 into outer shaft teeth 142 when knob 144 is turned in first direction. Knob 144 raises inner shaft teeth 138 out of outer shaft teeth 142 when knob 144 is turned in a second direction opposite the first direction. When stabilizing assembly 130 is in the unlocked position, inner shaft teeth 138 do not engage with outer shaft teeth 142 and inner shaft 132 and front fork 136 rotate or pivot freely with respect to outer shaft 134 and frame 140.

Figure 8:
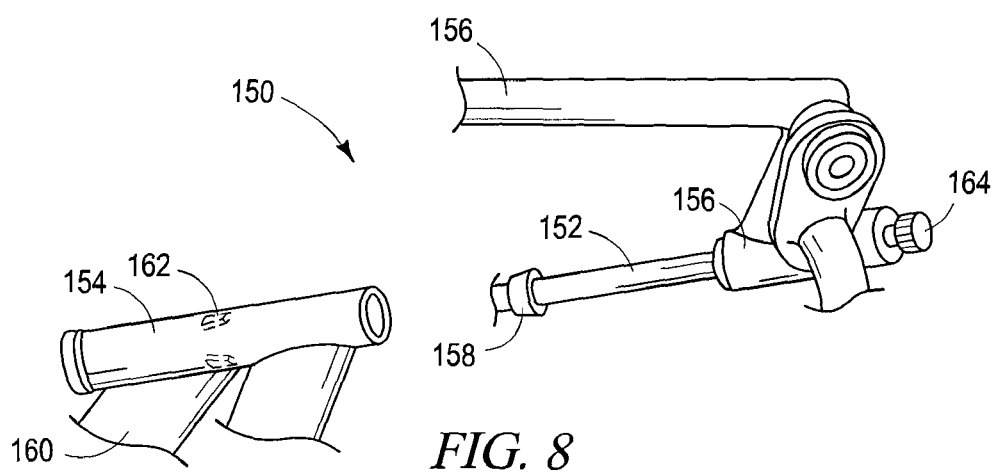
FIG. 8 illustrates an alternative embodiment of the stabilizing assembly with a friction fit shaft assembly.

FIG. 8 shows an alternative embodiment of the stabilizing assembly with a friction fit shaft assembly. Like stabilizing assembly 28, stabilizing assembly 150 is a temporary stabilizing device which holds handcycle 10 steady for a rider to safely maneuver onto or off of handcycle 10. Stabilizing assembly 150 comprises inner shaft 152 and outer shaft 154. Inner shaft is coupled to front fork 156. Inner shaft 152 includes a first locking component which comprises inner friction ring 158 disposed on the outside or peripheral surface of inner shaft 152. Inner friction ring 158 constitutes a friction component which is a stabilizing component or stabilizing member. Inner friction ring 158 has a tapered conical shape with a first end of inner friction ring 158 being narrower than a second end of inner friction ring 158. Outer shaft 154 is coupled to frame 160. Outer shaft 154 includes a second locking component which comprises outer friction ring 162 disposed on an inner surface of outer shaft 154. Outer friction ring 162 constitutes friction component which is a stabilizing component or stabilizing member. Outer friction ring 162 has a tapered shape with a first end nearest to inner friction ring 158 being narrower than a second end of outer fiction ring 162. Inner friction ring 158 fits into outer friction ring 162. Inner friction ring 158 and outer friction ring 162 fit together in a locked position to create friction and to hinder or prevent rotation of inner shaft 152 with respect to outer shaft 154.

Knob 164 is a locking component or locking member configured to engage friction components, inner friction ring 158 and outer friction ring 162, to reversibly reduce rotation of inner shaft 152 with respect to outer shaft 154. Knob 164 operates to adjust and position inner friction ring 158 into outer friction ring 162 to lock stabilizing assembly 150. Knob 164 lowers inner friction ring 158 into outer friction ring 162 when knob 164 is turned in a first direction. Inner friction ring 158 and outer friction ring 162 are pressed together when stabilizing assembly 150 is in the locked position. The frictional force between inner friction ring 158 and outer friction ring 162 allows inner shaft 152 and front fork 156 to remain stationary with respect to outer shaft 154 and frame 160. Knob 164 raises inner friction ring 158 out of outer friction ring 162 when knob 164 is turned in a second direction opposite the first direction. When stabilizing assembly 150 is in the unlocked position, inner friction ring 158 does not engage with outer friction ring 162 and inner shaft 152 and front fork 156 rotate freely with respect to outer shaft 154 and frame 160.

Figure 9:
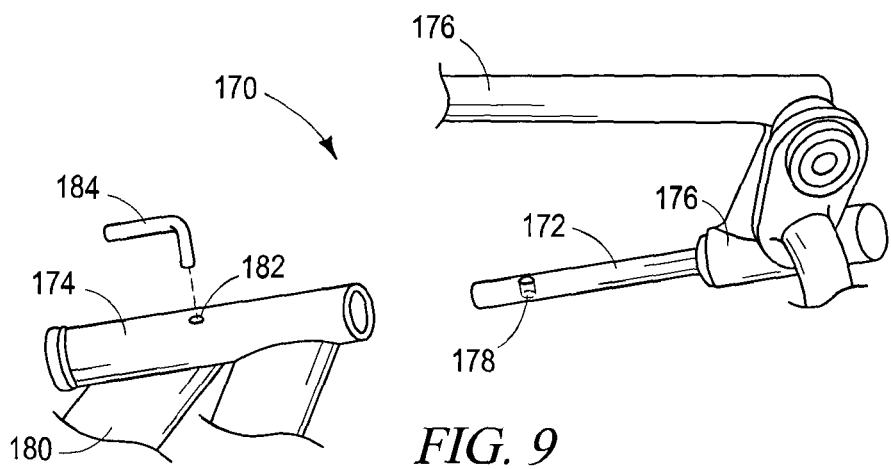
FIG. 9 illustrates an alternative embodiment of the stabilizing assembly with a pin which inserts through the axle.

FIG. 9 shows an alternative embodiment of the stabilizing assembly with a pin which inserts through the axle. Like stabilizing assembly 28, stabilizing assembly 170 is a temporary stabilizing device which holds handcycle 10 steady for a rider to safely maneuver onto or off of handcycle 10. Stabilizing assembly 170 comprises inner shaft 172 and outer shaft 174. Inner shaft 172 is coupled to front fork 176. Inner shaft 172 includes inner shaft hole 178 which is a small cavity or receptacle formed perpendicularly through inner shaft 172. Outer shaft 174 is coupled to frame 180. Outer shaft 174 includes outer shaft hole 182 which is an opening or receptacle in outer shaft 174. Inner shaft hole 178 and outer shaft hole 182 are stabilizing components or members configured to receive pin 184 when inner shaft hole 178 is aligned with outer shaft hole 182.

Front fork 176 is rotated until front fork is in a position where inner shaft hole 178 is aligned with outer shaft hole 182. Pin 184 is inserted though outer shaft hole 182 and inner shaft hole 178 to lock stabilizing assembly 170. Pin 184 is a locking component configured to engage inner shaft hole 178 and outer shaft hole 182 to reversibly reduce or limit rotation of inner shaft 172 and front fork 176 with respect to outer shaft 174 and frame 180. Stabilizing assembly 170 restricts movement of front fork 176 when stabilizing assembly 170 is locked. Pin 184 is removed from inner shaft hole 178 and outer shaft hole 182 to unlock stabilizing assembly 170. Inner shaft 172 and front fork 176 rotate freely with respect to outer shaft 174 and frame 180 when stabilizing assembly 170 is unlocked.

While one or more embodiments of the present invention have been illustrated in detail, the skilled artisan will appreciate that modifications and adaptations to those embodiments may be made without departing from the scope of the present invention as set forth in the following claims.

What is claimed is:

1. A stabilizing device for a handcycle, comprising:
    a handcycle frame including an outer shaft;
    a steering fork rotationally coupled to the handcycle frame, the steering fork including an inner shaft;
    a first stabilizing component coupled to the inner shaft of the steering fork;
    a second stabilizing component coupled to the outer shaft of the handcycle frame and in proximity to the first stabilizing component; and
    a locking component configured to engage the first and second stabilizing components to reduce rotation of the inner shaft of the steering fork with respect to the outer shaft of the handcycle frame, the locking component configured to be completely removed from the first and second stabilizing components.

2. The stabilizing device of claim 1, wherein the first and second stabilizing components include receptacles.

3. The stabilizing device of claim 1, wherein the locking component includes a pin configured to insert through the first and second stabilizing components.

4. The stabilizing device of claim 3, further including a receptacle formed in the inner shaft.

5. The stabilizing device of claim 4, wherein the pin is further configured to be stored in the receptacle when the locking component is disengaged.

6. A handcycle, comprising:
    a handcycle frame including a first frame member rotationally coupled to a second frame member; and
    a stabilizing assembly disposed on the handcycle frame to reversibly limit motion of the first frame member with respect to the second frame member, wherein the stabilizing assembly includes a first shaft including a first plurality of teeth and a second shaft including a second plurality of teeth and wherein the first plurality of teeth fit into the second plurality of teeth to lock the stabilizing assembly.

7. A handcycle, comprising:
    a handcycle frame including a first frame member rotationally coupled to a second frame member; and
    a stabilizing assembly disposed on the handcycle frame to reversibly limit motion of the first frame member with respect to the second frame member, wherein the stabilizing assembly includes a first shaft including a first friction ring and a second shaft including a second friction ring.

8. The handcycle of claim 7, wherein the first friction ring fits into the second friction ring to lock the stabilizing assembly.

\* \* \* \* \*